United States Patent [19]

McManus

[11] Patent Number: 5,215,728

[45] Date of Patent: *Jun. 1, 1993

[54] METHOD AND APPARATUS FOR REMOVAL OF H2S FROM A PROCESS GAS, INCLUDING THIOSULFATE AND/OR CYANIDE SALT DECOMPOSITION

[75] Inventor: Derek McManus, Roselle, Ill.

[73] Assignee: ARI Technologies Inc., Palatine, Ill.

[*] Notice: The portion of the term of this patent subsequent to Dec. 1, 2009 has been disclaimed.

[21] Appl. No.: 630,823

[22] Filed: Dec. 20, 1990

[51] Int. Cl.$^5$ .............................. C01B 17/16
[52] U.S. Cl. ................ 423/220; 423/242.1; 423/236; 423/563; 423/567 R; 422/170
[58] Field of Search .......... 423/140, 141, 154, 242 A, 423/242 R, 236, 563, 567 A, 567 R, 578, 242.1, 220; 422/170

[56] References Cited

U.S. PATENT DOCUMENTS

| | | | |
|---|---|---|---|
| 3,773,662 | 11/1973 | Urban | 210/50 |
| 3,941,875 | 3/1976 | Tsuruta | 423/571 |
| 4,013,430 | 3/1977 | Adachi | 55/37 |
| 4,091,074 | 5/1978 | Gorai | 423/235 |
| 4,098,886 | 7/1978 | Nicklin | 423/226 |
| 4,387,084 | 6/1983 | Brandenburg et al. | 423/567 A |
| 4,565,678 | 1/1986 | Zielke | 423/235 |
| 4,654,148 | 3/1987 | Baker | 210/766 |

OTHER PUBLICATIONS

"Grant and Otackh's Chemical Dictionary", 5th ed. by Roger and Claire Grant, p. 37, 1987.

Primary Examiner—Gary P. Straub
Assistant Examiner—Timothy C. Vanoy
Attorney, Agent, or Firm—Marshall, O'Toole, Gerstein, Murray & Bicknell

[57] ABSTRACT

A method and apparatus for the hydrothermal treatment of a catalytic polyvalent metal redox absorption solution, after absorption of the H2S from an H2S containing gas stream, to avoid substantial buildup of thiosulfate salts, cyanide salts, and cyanide complexes in the catalytic polyvalent metal redox solution. The method and apparatus of the present invention is particularly useful for treating gas streams containing both H2S and HCN concurrently for destruction of the cyanide salts and cyanide complexes and conversion of H2S and by-product salts to elemental sulfur.

33 Claims, 1 Drawing Sheet

METHOD AND APPARATUS FOR REMOVAL OF H2S FROM A PROCESS GAS, INCLUDING THIOSULFATE AND/OR CYANIDE SALT DECOMPOSITION

FIELD OF THE INVENTION

The present invention is directed to a method and apparatus for selectively removing $H_2S$ gas from a process gas stream using a polyvalent metal redox catalyst solution, such as an iron chelate absorption solution, e.g. the ARI Technologies Inc. LO-CAT ® solution, or a metal vanadate-containing absorption solution together with an anthraquinone disulfonate (ADA), such as that used in the Stretford process, to react the $H_2S$ gas selectively from the process gas stream to form elemental sulfur. More particularly, the present invention is directed to a method and apparatus for removing $H_2S$ from a process gas using a polyvalent metal redox absorption solution, and removing salts from the redox solution by hydrothermal reaction (decomposition). The hydrothermal conversion treatment of the present invention removes thiosulfates and, optionally, cyanide salts and cyanide complexes and is useful in any $H_2S$ removal process that uses a catalytic polyvalent metal redox absorption solution in two valance states for absorption of $H_2S$, and regeneration of the polyvalent metal redox solution, with or without other impurities, and is particularly effective for the removal of $H_2S$ and HCN from a process gas without requiring a separate pre-treatment step for HCN removal before absorption of the $H_2S$ by the catalytic polyvalent metal redox solution.

BACKGROUND OF THE INVENTION AND PRIOR ART

Two of the most widely used processes for removal of $H_2S$ from process gas streams are the redox processes that use 1) an iron chelate absorption solution, e.g. LO-CAT ®, and 2) a vanadium-based redox absorption solution, e.g. the Stretford process. The oxidation-reduction reactions that permit these processes to be carried out continuously are well known to those skilled in the $H_2S$ removal art and are well documented in the literature. The ferric iron chelate-$H_2S$ reactions can be represented as follows:

$$H_2S(gas) + H_2O(Liquid) \rightleftharpoons H_2S(aqueous) + H_2O(Liquid)$$

$$H_2S(aqueous) \rightleftharpoons H^+ + HS^-$$

$$HS^- \rightleftharpoons H^+ + S^=$$

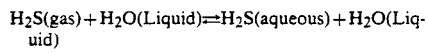

By combining these equations, the resulting equation is:

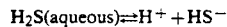

In order to have an economical, workable process to effect catalytic oxidation of the hydrogen sulfide using iron as the polyvalent metal, it is essential that the hydrogen sulfide gas be brought continuously into intimate contact with an iron chelate redox solution and that the ferrous iron chelate formed in the above described manner be continuously regenerated by oxidizing to ferric iron chelate by intimate contact with dissolved oxygen, preferably from ambient air. The series of reactions that take place when regenerating the required ferric iron chelate can be represented by the following equations:

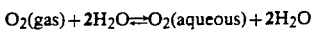

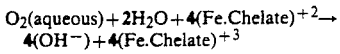

By combining these equations, the resulting equation is:

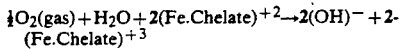

The economics and workability of the Stretford process have depended upon a large volume of the vanadium solution, and that the reduced metal vanadate, after absorption of the $H_2S$ (as $HS^-$ and $S^=$) to form the metal vanadate in the $+4$ valance state is continuously regenerated to the $+5$ valance state by contact with dissolved oxygen for further use of the oxidized metal vanadate in an absorption zone of the process to remove additional $H_2S$ as elemental sulfur, by which hydrogen sulfide gas is converted to elemental sulfur and water. The Stretford process chemistry is typically summarized according to the following steps:

Absorption and dissociation of $H_2S$ into alkali:

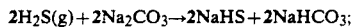

Bisulfide oxidation with metavanadate to form elemental sulfur and reduced vanadium:

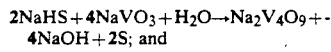

Vanadium reoxidation by dissolved molecular oxygen in the presence of ADA:

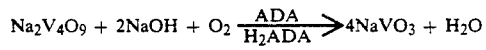

It is evident from the foregoing equations that theoretically two moles of ferric iron chelate or $V^{+5}$ redox solution must be supplied to the absorption zone in which the hydrogen sulfide gas is oxidized to form elemental sulfur for each mole of hydrogen sulfide gas treated, and in actual practice considerably more than the theoretical amount of ferric iron chelate or $V^{+5}$ redox absorption solutions are used. In a continuous process of removing hydrogen sulfide by contact with a catalytic ferric iron chelate solution or a metal vanadate ($V^{+5}$) solution, catalytic solution is circulated continuously between an absorber zone, where the $H_2S$ is absorbed by the catalytic ferric iron or metal vanadate ($V^{+5}$) solution, and the polyvalent metal redox solution is reduced to ferrous iron or $V^{+4}$ in an oxidizer zone where the ferrous iron chelate solution or reduced $V^{+4}$ solution is oxidized back to the ferric iron or $V^{+5}$ state. Accordingly, either high concentrations of chelated iron or metal vanadate absorption solution is employed in the catalytic solution, or the rate of circulation has been high to assure that sufficient catalytic metal is present for substantially complete absorption of the $H_2S$ (as $HS^-$ or $S^=$).

A great many prior art patents are directed to the removal of $H_2S$ using catalytic polyvalent metal redox solutions, such as an iron chelate or a metal vanadate. Examples of the prior art patents directed to the use of polyvalent metal chelate solution for H₂S removal include the following U.S. patents: Hartley, et al. U.S. Pat. No. 3,068,065; Sibent, et al. U.S. Pat. No. 3,897,219; Salemme U.S. Pat. No. 3,933,993; Meuly U.S. Pat. No. 4,009,251; Mancini; et al. U.S. Pat. No. 4,011,304; Thompson U.S. Pat. No. 4,189,462; Hardison U.S. Pat. No. 4,238,462; Blytas, et al. U.S. Pat. No. 4,356,155; Hardison U.S. Pat. No. 4,482,524; McManus, et al. U.S. Pat. No. 4,622,212; Primach, et al. U.S. Pat. No. 4,455,287; Fong, et al. U.S. Pat. No. 4,664,902 and U.S. Pat. No. 4,705,676.

One of the most significant problems in the removal of H₂S gas using a polyvalent metal redox absorption chelate solution, particularly either an iron chelate redox absorption solution or a vanadium-based redox absorption solution, is that the efficiency of the redox reactions required of polyvalent metal chelate solutions is somewhat pH dependent. It is well known that polyvalent metal redox solutions are capable of solubilizing the contaminant metal ions at a pH well above pH 7, but the speed of the redox reactions decreases substantially with decreasing pH, despite statements in issued patents to the effect that a broad range of pH is acceptable—e.g. see Hartley U.S. Pat. No. 3,068,065; Pitts, Jr., et al. U.S. Pat. No. 3,097,925; Meuly, et al. U.S. Pat. No. 3,226,320; Roberts, et al. U.S. Pat. No. 3,622,273. Others have recognized that periodic addition of alkali is needed to maintain a suitably high pH for redox reaction efficiency—e.g. see Roberts et al. U.S. Pat. No. 3,622,273, since the pH tends to drop as the reactions proceed.

As described in the Meuly U.S. Pat. No. 4,009,251, it is recognized that the pH of polyvalent metal redox solutions is lowered during the H₂S removal (absorption) reactions because of other side reactions between the chelate solution and the H₂S and the resulting formation of salts formed by polyvalent metal reactions with contaminants dissolved in the polyvalent metal solution after significant contact with the process gas. When H₂S is the only significant contaminant in the process gas, these side reaction products, as recognized in the Meuly U.S. Pat. No. 4,009,251, are for the most part oxides of sulfur represented by the formula $S_xO_y$, where x is generally 1 or 2 and y is generally 3 or 4, that are present in an alkali-containing polyvalent metal redox solution as sulfites, sulfates and thiosulfates. If additional reactive contaminant ions are dissolved into an alkali-containing polyvalent metal redox solution from the process gas, for example, if HCN is a significant component in the process gas, thereby providing cyanide ions, $CN^-$, in the polyvalent metal redox solution, a great many additional side reaction product salts are formed in the polyvalent metal redox solution, particularly side reaction products such as complexes between the polyvalent metal of the redox solution and the cyanide ions; and side reaction products between sulfur compounds (such as thiosulfate, polysulfides and elemental sulfur) sulfide ions and cyanide ions to form thiocyanates and complex metal cyanide complexes.

The more salts that are formed in the polyvalent metal redox solution as a result of a relatively high pH, e.g. above 7, and particularly between about 8 and 9.5, the more frequently it is necessary to add alkali periodically to maintain the desired relatively high pH. As a result, more salts are formed in the polyvalent redox solution, thereby requiring a periodic "blowdown" of polyvalent metal redox solution (a term used to denote the irretrievable discarding of some or all of the polyvalent metal redox solution and replacement with fresh, non salt-contaminated solution). Since the polyvalent metal redox solutions are relatively expensive, the efficiency of the redox reactions catalyzed by polyvalent metal redox solutions at a relatively high pH must be balanced by the expense of the addition of alkali and the expense of lost solution because of "blowdown" being necessary periodically to maintain the redox solution salt concentration below an acceptable level. Further, the sulfur salts formed necessarily reduce the elemental sulfur yield from the H₂S removal process.

One method disclosed useful to substantially inhibit salt formation in a polyvalent metal redox solution in a process for the catalytic removal of H₂S from a process gas is disclosed in the Meuly U.S. Pat. No. 4,009,251, using particular polyvalent metal chelating agents to inhibit oxidation of sulfur beyond elemental sulfur.

Some of the most troublesome salts formed in the absorption chamber of a polyvalent metal redox absorption solution process for selective removal of both H₂S and HCN impurities from a process gas that heretofore have dictated that the HCN be removed from the gas before polyvalent metal redox absorption of H₂S are, for example, thiocyanates, and various complexes between the polyvalent metal of the redox solution and cyanide ions, e.g. $[Fe(CN)_6]^{-4}$ and $[Fe(CN)_6]^{-3}$ which remain in the solution as contaminants. The hydrothermal decomposition of thiosulfates and sulfur-cyanide salts, e.g. $SCN^-$, and the polyvalent metal-cyanide complexes, particularly the polyvalent metal-cyanide complexes $[Fe(CN)_6]^{-4}$ and $[Fe(CN)_6]^{-3}$, permits the process of the present invention to treat a process gas containing both H₂S and HCN. This hydrothermal decomposition is made possible by pre-treating the polyvalent metal redox solution in the hydrothermal polyvalent metal precipitation process of the present invention to precipitate the metal as, for example, a polyvalent metal sulfide from the polyvalent metal redox solution, prior to high temperature salt and complex decomposition, to prevent the metal sulfides from fouling the hydrothermal reactor and redox solution preheating devices, e.g. heat exchangers.

SUMMARY OF THE INVENTION

The present invention is directed to a method and apparatus for the hydrothermal treatment of a catalytic polyvalent metal redox absorption solution, after absorption of the H₂S from an H₂S containing gas stream, to avoid substantial buildup of thiosulfate salts, cyanide salts, and cyanide complexes in the catalytic polyvalent metal redox solution. The method and apparatus of the present invention is particularly useful for treating gas streams containing both H₂S and HCN concurrently for destruction of the cyanide salts and cyanide complexes and conversion of H₂S and by-product salts to elemental sulfur.

In accordance with one important embodiment of the present invention, it has been found that gas streams containing both H₂S and HCN can be treated to achieve an increased sulfur yield by converting sulfur by-product salts into elemental sulfur. The salts and complexes dissolved in the polyvalent metal redox solution are decomposed in the hydrothermal decomposition treatment of the present invention and can be recycled to the polyvalent metal redox H₂S absorption process for recovery of additional sulfur and polyvalent metal from the salts and complexes, thereby increasing sulfur yield and eliminating the need to periodically replace salt-contaminated polyvalent metal redox solution with costly fresh solution. Both $H_2S$ and HCN can be removed from a process gas in the same polyvalent metal redox process, without a separate pre-treatment step for removal of HCN. The salts that are dissolved in the catalytic polyvalent metal redox solution in the absorption zone of the process are decomposed in the hydrothermal converter without oxygen added to the hydrothermal converter, by a simple anaerobic hydrothermal decomposition reaction of the thiocyanate, thiosulfate and cyanide salts, and complex metal cyanide compounds at a sufficiently high temperature to decompose the salts and complexes.

The decomposition treatment in accordance with the present invention is particularly advantageous where the process gas contains cyanides, since the hydrothermal treatment will decompose the cyanide salts and cyanide complexes that are dissolved in the polyvalent metal redox solution in the absorber. Quite unexpectedly, it has been found that suitably high temperature and pressure combinations, for example, at a temperature above about 400° F., preferably in the range of about e.g. 600° F. to about 700° F. and pressures of at least about 1000 psig., preferably about 1500 psig. to about 2500 psig. e.g. 2000 psig., in a hydrothermal treater, without the presence of oxygen, will enable the thiosulfate, thiocyanate and/or cyanide salts and cyanide complexes that have accumulated in the polyvalent metal redox solution in the absorption zone to decompose via hydrothermal conversion. The decomposition products of the salts and complexes can be sent back to the absorber or the oxidizer of the process, together with the treated polyvalent metal redox solution, for conversion of the newly formed sulfide and polysulfide salts to sulfur, and to prevent losses of polyvalent metal redox solution, thereby achieving more complete sulfur recovery.

In accordance with another new and unexpected feature of the present invention, substantially all of the cyanide salt and cyanide complex decomposition products recovered from the hydrothermal converter can be oxidized in the oxidizer zone of the polyvalent metal redox process and apparatus of the present invention, without substantial buildup of salts in the polyvalent metal redox solution. While some of the polyvalent metal redox solution can be replaced periodically if an unusually high process gas contamination concentration is encountered on occasion, in accordance with a preferred embodiment of the present invention, periodic replacement of catalytic polyvalent metal redox solution should not be necessary in the steady state operation of the process and apparatus using a hydrothermal converter for salt control in the polyvalent metal redox solution. The hydrothermal converter can be operated on a continuous basis or can be used periodically to clean an aliquot of polyvalent metal redox solution of salts as an alternative to discard of solution via "blowdown".

Accordingly, one aspect of the present invention is to provide a new and improved method and apparatus for controlling or eliminating salt buildup in a catalytic polyvalent metal redox solution used in selective removal of $H_2S$ from $H_2S$-contaminated process gas streams.

Another aspect of the present invention is to provide a new and improved method and apparatus for controlling or eliminating salt buildup in a catalytic polyvalent metal redox solution used in selective removal of both $H_2S$ and HCN from process gas streams.

Another aspect of the present invention is to provide a new and improved method of hydrothermally decomposing thiosulfate salts and/or cyanide salts, such as thiocyanate, and/or cyanide complexes that form in the polyvalent metal redox solution to avoid loss of costly polyvalent metal redox solution due to excessive salt formation and/or inactivity due to polyvalent metal losses.

A further aspect of the present invention is to provide a method and apparatus for hydrothermally reacting a sulfur or cyanide-containing compound with a water component to form reaction products, anaerobically at high temperature and pressure without adding hydrogen or oxygen gas to the converter for removal of the sulfur and/or cyanide.

BRIEF DESCRIPTION OF THE DRAWINGS

The above and other aspects and advantages of the present invention will become apparent from the following detailed description of the present invention wherein.

DETAILED DESCRIPTION OF THE PREFERRED EMBODIMENTS

Figure 1:
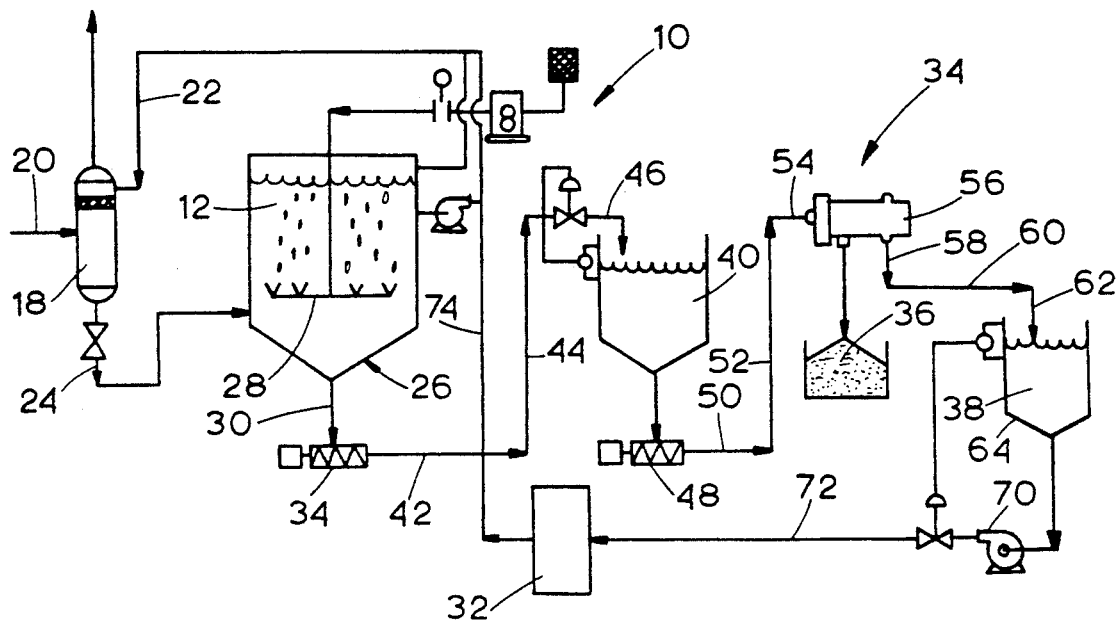
FIG. 1 is a schematic side view of the process and apparatus of the present invention for hydrothermal decomposition of thiosulfate salts and/or cyanide salts, such as thiocyanate, and/or cyanide complexes from the catalytic polyvalent metal redox solution.

The present invention is directed to a method and apparatus for treating an $H_2S$ containing gas stream to avoid substantial thiosulfate salts and other salt buildup in a catalytic polyvalent metal chelating solution, and more particularly, to a method of treating gas streams containing both HCN and $H_2S$ concurrently for destruction of by-product cyanide compounds, such as thiocyanate and complex metal cyanides, and conversion of $H_2S$ and decomposed salts and complexes to elemental sulfur.

The method and apparatus of the present invention is particularly useful for removal of $H_2S$ and HCN from a coke oven gas. Coke oven gas is produced by roasting coal in anaerobic ovens to produce a solid product suitable for use as a reducing agent for iron oxide in blast furnaces. This gas ordinarily contains carbon monoxide, hydrogen and hydrocarbon gases as principal ingredients, and usually contains HCN and $H_2S$ as impurities. A typical coke oven gas contains about

|  | ppm | gr/100 SCF |
| --- | --- | --- |
| $H_2S$ | 5000 | 314 |
| HCN | 1000 | 50 |

It is necessary to remove the $H_2S$ from the COG to prevent the emission of $SO_x$ from various combustion devices in which the gas is used as a fuel. A typical steel plant coke oven produces about 100 MMSCFD of gas, which would result in the emission of about 15,000 ton/year of SO$_2$.

The H$_2$S is usually removed by a wet scrubbing process. Regenerable alkaline solutions absorb the H$_2$S and strip it out of the solution at a high enough concentration to use a conventional Claus process for conversion to H$_2$S.

Other catalytic polyvalent metal redox removal processes, such as the Stretford or LO-CAT ® process, usually have removal of the HCN in a separate scrubbing stage before the gas enters the absorber. This is because the HCN in the gas stream reacts with sulfur and the alkaline salts in the solution to form an alkali metal or alkaline earth metal thiocyanates, such as NaSCN or NH$_4$SCN, and various complexes between the polyvalent metal redox solution and cyanide ions, e.g. [Fe(CN)$_6$]$^{-4}$ and [Fe(CN)$_6$]$^{-3}$ which remain in the solution. Purging solution to remove the SCN$^-$ and polyvalent metal-cyanide complexes to hold an acceptable concentration of, e.g. 20% to 30% by weight salts would require discard of an excessive quantity of the active polyvalent metal catalyst ingredients.

In accordance with the present invention, it has been found that sulfite and thiosulfate salts and cyanide salts and metal cyanide complexes accumulated in the catalytic polyvalent metal redox solution in a process for converting H$_2$S to sulfur, e.g. using iron chelate or vanadium-based redox solutions, can be treated at high temperature and pressure in a simple reactor without the addition of air or any other chemical oxidizing or reducing agent, to decompose the thiosulfates to H$_2$S, NaHS and Na$_2$SO$_4$. In addition to the destruction of Na$_2$S$_2$O$_3$, substantially complete conversion of NaSCN also is achieved.

The decomposition products can be returned to the LO-CAT ® absorber unit to recover the sulfur as product and use the Na to help maintain alkalinity. The sulfate component is not useful and can be purged. These decomposition products then can be processed in the catalytic polyvalent metal chelate H$_2$S removal process for conversion to sulfur, and the alkaline values are recovered so that it is not necessary to add replacement NaOH or other alkali periodically to keep the alkalinity of the chelate solution at a level high enough for efficient conversion of H$_2$S to sulfur.

The hydrothermal converter process step of the present invention for decomposition of salts and complexes is particularly well suited to treating a process gas containing both H$_2$S and HCN without requiring a separate HCN-removal pretreatment step since the hydrothermal treatment will also decompose sulfur-cyanide salts, e.g. SCN$^-$, and polyvalent metal-cyanide complexes, particularly the polyvalent metal-cyanide complexes [Fe(CN)$_6$]$^{-4}$ and [Fe(CN)$_6$]$^{-3}$, and decomposes these contaminants to materials that can be converted back to sulfur by reaction with oxidized catalytic polyvalent metal redox solution while recovering alkali values.

In accordance with a preferred embodiment of the present invention it has been found that the NaSCN or NH$_4$SCN salts formed by catalytic oxidation of H$_2$S to sulfur by contact with a polyvalent metal redox solution can be decomposed hydrothermally under conditions of high pressure of at least about 1000 psig., and preferably at least about 1500 psig., particularly within the range of about 1500 to about 2500 psig., e.g. about 2000 psig.—and a high temperature above about 400° F., and preferably at least about 500° F., particularly in the range of about 600° F. to about 700° F., e.g. about 650° F., in a simple anaerobic reactor without the addition of oxygen or any other chemical reagent. This was quite unexpected and appears to be unknown so far as chemical literature is concerned. The reactions which take place appear to include:

$$2NaSCN + 4H_2O \rightarrow H_2S + 2NH_3 + 2CO_2$$

Under the conditions described, 90% conversion can be obtained in about one hour residence time at temperature.

The reaction in the hydrothermal converter appears to be a reaction between a sulfur or cyanide molecule entering the converter, and a water component, e.g. hydrogen, hydroxyl ions, oxygen or hydrogen and/or oxygen ions or hydrogen ions. The hydrothermal converter operates without the addition of hydrogen or oxygen gas. This seems to be the case since ammonia is formed in some cases in the converter without hydrogen entering the converter except for hydrogen present in the water. Accordingly, the hydrothermal converter is useful in accordance with the present invention for decomposition of any type of sulfur of cyanide compounds as well as reactions of sulfur and/or cyanide compounds with a water component to form any type of theoretically possible reaction products of sulfur or cyanide with hydrogen, oxygen and/or hydroxyl radical or molecules.

In accordance with a very significant feature of the present invention, substantially all of the hydrothermal converter reaction products are suitable for return to the LO-CAT ® or Stretford plant, and need not be discarded at all. By blending the hydrothermal treater effluent with a substantial excess of oxidized catalytic polyvalent metal chelate solution, the sulfide and polysulfide ions contained in the effluent are converted to elemental sulfur and the alkaline values are recovered so that it is not necessary to add replacement NaOH, or other alkali to keep the alkalinity of the solution to a relatively high level, e.g. pH 8.0 to 9.5.

Under the conditions described, the polyvalent metal-cyanide complexes also are decomposed, liberating NH$_4^+$, HCO$_3$ and FeS or FeS$_2$. The efficiency of decomposition of [Fe(CN)$_6$]$^{-4 \text{ or } -3}$ complexes under the conditions described was generally at least about 80% by weight, and sometimes in excess of 99%. In order to carry out the hydrothermal decomposition, the polyvalent metal is first removed from the polyvalent metal redox solution being treated, such as by precipitating the metal as a sulfide, e.g. iron sulfide by addition of S$^=$ to the solution in a reaction vessel at a temperature of room temperature to about 400° F., preferably about 150° F. to about 350° F. at a pressure of about 50 psig. to about 150 psig., to prevent the metal sulfides from precipitating in the hydrothermal converter or preheating apparatus, e.g. heat exchangers, or alternate heat exchangers can be employed and cleaned of FeS periodically.

Turning now to the drawings, and initially to FIG. 1, there is illustrated a process and apparatus, generally designated by reference numeral 10, for the polyvalent metal catalyzed removal of H$_2$S, or both H$_2$S and HCN from a process gas, such as coke oven gas. A process gas that contains H$_2$S or both H$_2$S and HCN is directed into a suitable gas-liquid contact device, or absorption tower 18, through process gas inlet conduit 20 for intimate contact and mass transfer with a countercurrently downwardly flowing polyvalent metal redox absorption solution entering an upper portion of the absorber 18 through liquid inlet conduit 22. The absorption tower can include any means for establishing intimate contact between liquid and gas, such as bubble cap trays, Rachig rings or other packing materials. In the absorber 18, the $H_2S$ from the process gas is absorbed by the polyvalent metal redox catalyst solution and some dissolved polyvalent metal sulfide and thiosulfates accumulate in the redox absorption solution rendering the redox absorption solution less active. If the process gas stream also contains HCN, sulfur-cyanide salts, such as thiocyanates, and polyvalent metal-cyanide complexes, e.g. $[Fe(CN)_6]^{-4 \, or \, -3}$ also form in the polyvalent metal redox solution within the absorber 18.

In accordance with the present invention, the catalytic polyvalent metal redox solution is subjected to a hydrothermal treatment at high temperature and pressure to decompose the salts from the redox absorption solution. Advantageously, the salts and complexes, after decomposition in the hydrothermal converter 32 can be returned to the absorber 18 or the oxidizer 12 of the $H_2S$-removal process for recovery of sulfur and alkali thereby avoiding the necessity of periodic alkali addition to maintain a favorably high pH in the absorber 18, limiting the salts formed in the absorber 18, and increasing the sulfur yield.

As shown in FIG. 1, the $H_2S$-laden and salt-laden polyvalent redox absorption solution from the absorber 18 is directed along conduit 24 into an oxidizer vessel, generally designated by reference numeral 26, where an oxygen-containing gas, e.g. air, is pumped through sparger 28 in countercurrent flow to the catalytic polyvalent metal redox solution 12, in finely divided bubbles, to convert the $H_2S$ to sulfur, recovered at the bottom of oxidizer 26 in conduit 30, and to reoxidize the metal chelate solution, e.g. to $Fe^{+3}$ or $V^{+5}$, so that the polyvalent metal redox solution is capable of absorbing additional $H_2S$ in the absorber 18.

As shown in the drawings, a hydrothermal treating converter apparatus of the present invention, designated by reference numeral 32, is disposed in a polyvalent metal redox solution recovery conduit for treating polyvalent metal redox solution on route from a sulfur-polyvalent metal redox solution separation section of the apparatus, generally designated 34. It should be understood, however, that the hydrothermal converter 32 can be used batch-wise to treat polyvalent metal redox solution or the converter 32 can be used at other points along the process and apparatus in accordance with the present invention.

As shown in FIG. 1, sulfur and oxidized polyvalent metal redox solution is withdrawn from the oxidizer vessel 12 through conduit 12 and pumped as a slurry, by slurry pump 34 into the sulfur recovery apparatus 34. FIG. 1 shows one of many possible combinations of sulfur recovery apparatus useful in accordance with the method and apparatus of the present invention for separation of sulfur 36 from polyvalent metal redox solution 38. Alternative methods are well known to those skilled in the art, for example, by melting the sulfur for separation of molten sulfur from the polyvalent metal redox solution as a lower liquid layer, by gravity. The sulfur recovery apparatus 34 includes a centrifuge feed tank 40 that receives a sulfur/polyvalent metal redox solution slurry from slurry pump 34, via conduits 42, 44 and 46; and a slurry pump 48 that feeds the sulfur and polyvalent metal redox solution slurry through conduits 50, 52 and 54 to centrifuge 56. The centrifuge 56 separates the slurry into sulfur 36 and the polyvalent metal redox solution 38. The polyvalent metal redox solution 38 is received in a clarified polyvalent metal redox solution vessel 64 from centrifuge 56 and conduits 58, 60 and 62 and flows from the clarified polyvalent metal redox solution vessel 64 through conduits 66 and 68, pump 70, and conduit 72 to the hydrothermal converter 32. After hydrothermal treatment in hydrothermal converter 32, the polyvalent metal redox solution flows through conduits 74, 76, 78 and 80 into an upper portion of the absorber 18 or oxidizer 12 for mass transfer with process gas in the absorber 18 or for oxidation on route to the absorber 18.

Figure 2:
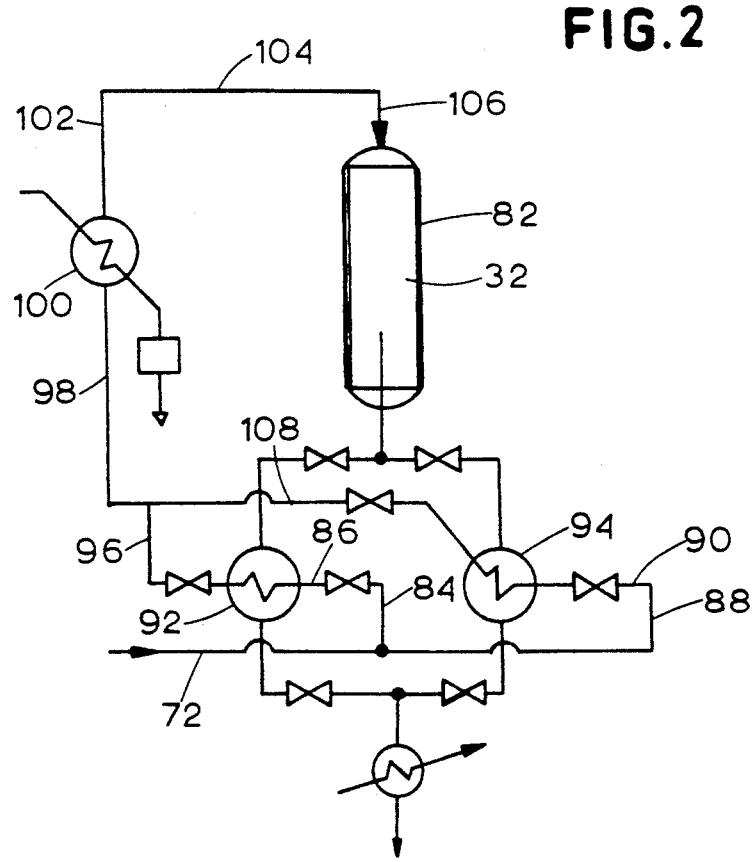
FIG. 2 is a schematic side view of the hydrothermal treater portion of the apparatus and process of the present invention, for hydrothermal decomposition of thiosulfate salts and/or cyanide salts, such as thiocyanate, and/or cyanide complexes to avoid loss of costly polyvalent metal redox solution due to excessive salts or inactivity, showing heat recovery, alternate heat exchangers and optional decomposition of salts from blowdown of polyvalent metal redox solution.

The hydrothermal converter 32 is shown in more detail in FIG. 2. The hydrothermal converter 32 is any simple reaction vessel designed to withstand the temperatures and pressures e.g. 600°–700° F. and 1500–2500 psig. used to decompose thiosulfate and, when present, cyanide salts, such as thiocyanates, and metal cyanide complexes into the aforementioned smaller molecules that can be returned to the absorber 18 or oxidizer 12 for recovery as sulfur and to recover the alkali values from the salts and complexes. The hydrothermal converter 32 can be any type of vessel adapted for indirect heating of an internal reactant to temperatures in the range of above about 400° F. to about 700° F. and at pressures of about 1000 psig. to about 3000 psig. The hydrothermal converter vessel 32 of FIG. 1 includes an outer jacket 82 that receives steam for reaching and maintaining temperatures of about 500° F. to about 750° F. for a period of time of about 30 minutes to about 4 hours to achieve at least about 80% by weight decomposition of thiosulfate and, when present, cyanide salts, such as thiocyanate, and metal-cyanide complexes. Thiosulfate salt decomposition achieved in hydrothermal converter 32 generally is at least about 90% by weight, whereas the cyanide salt and cyanide complex decomposition in the hydrothermal converter generally is at least about 80% by weight, and more than 99% by weight decomposition has been achieved on a laboratory scale.

As shown in FIG. 2, the salt-laden polyvalent metal redox solution flows through conduit 72 on route to the hydrothermal treater 32 and is preheated in indirect heat exchanger 92 or indirect heat exchanger 94, respectively, by processed polyvalent metal redox solution from the converter 32. Partially heated polyvalent metal redox absorption solution from heat exchanger 92 or 94 flows through conduits 96 or 108 and then through hot oil preheater 100 for further heating of the polyvalent metal redox solution before entering the hydrothermal converter 32 via conduits 102, 104 and 106.

It should be understood that polyvalent metal redox solution containing one or more thiosulfate salts and/or cyanide salts and/or cyanide complexes from any point in the $H_2S$ removal process, can be treated in the hydrothermal converter 32 in accordance with the present invention for salt and/or complex removal from the catalytic polyvalent metal redox solution.

Experimental

Iron depleted LO-CAT ® chelate catalyst solution was used as feedstock to the hydrothermal converter 32. This solution was delivered at nominally 4.5 $cm^3.min^{-1}$ to the hydrothermal converter 32, operating at approximately 620° F. and 2250 psig. Residence time was nominally 90 minutes. The sample of filtered effluent was quantitatively analyzed. The thiocyanate content was thus reduced from 7.67% to 1.26%, an 84% reduction.

It should be understood that the present disclosure has been made only by way of preferred embodiments and that numerous changes in details or construction, combination and arrangement of parts and process steps can be resorted to without departing from the spirit and scope of the invention as hereunder claimed.

What is claimed is:

1. A method of removing $H_2S$ from a process gas including the steps of:
   intimately contacting the process gas with an aqueous catalytic polyvalent metal redox solution to absorb the $H_2S$ into the polyvalent metal redox solution, and to form a reduced catalytic polyvalent metal redox solution;
   oxidizing the reduced catalytic polyvalent metal redox solution sufficiently to regenerate the catalytic polyvalent metal redox solution such that it is capable of absorbing $H_2S$ from said process gas; and
   anaerobically treating a portion of the aqueous polyvalent metal redox solution, said solution containing a thiosulfate salt, after absorption of $H_2S$, at a temperature in the range of about 400° F. to about 700° F. and a pressure of at least about 1000 psig, without the addition of hydrogen, for a time sufficient to decompose thiosulfate salts present in the polyvalent metal redox solution.

2. The method of claim 1, wherein the thiosulfate salts in the polyvalent metal redox solution are decomposed for a time sufficient to decompose at least about 80% by weight of the thiosulfate salts present in the polyvalent metal redox solution.

3. The method of claim 1, wherein the thiosulfate salt-containing polyvalent metal redox solution is anaerobically treated at a temperature of at least about 600° F. and a pressure of at least about 1500 psig.

4. The method of claim 3, wherein the thiosulfate salt-containing polyvalent metal redox solution is subjected to a temperature in the range of about 600° F. to about 700° F. and a pressure in the range of about 1500 psig to about 2500 psig.

5. The method of claim 1 further including the step of removing essentially all of any polyvalent metal from the polyvalent metal redox solution before decomposing the thiosulfate salts therefrom.

6. The method of claim 5, wherein the polyvalent metal is removed from the polyvalent metal redox solution by adding an $S^=$ reactant to the polyvalent metal redox solution to form a polyvalent metal sulfide precipitate.

7. The method of claim 6, wherein the $S^=$ reactant is derived, at least in part, from the decomposition of thiosulfate.

8. The method of claim 1, wherein the process gas further includes a cyanide gas, and including the step of absorbing cyanide in the polyvalent metal redox solution together with the $H_2S$, and thereafter decomposing cyanide salts or cyanide complexes together with the thiosulfate.

9. The method of claim 1, wherein products of decomposition are returned to the process to recover sulfur therefrom.

10. The method of claim 8, wherein products of decomposition are returned to the process to recover sulfur therefrom.

11. The method of claim 1 further including the steps of withdrawing elemental sulfur together with a minor proportion of polyvalent metal redox solution after intimate contact of the process gas with polyvalent metal redox solution or after oxidizing the reduced polyvalent metal redox solution;
    separating the elemental sulfur from the polyvalent metal redox solution;
    and wherein the polyvalent metal redox solution anaerobically treated to decompose the thiosulfate salts is the polyvalent metal redox solution separated from the elemental sulfur.

12. The method of claim 11 further including the step of separating the dissolved polyvalent metal from the polyvalent metal redox solution before decomposing the thiosulfate salts.

13. The method of claim 12, wherein the polyvalent metal is separated by adding $S^=$ to the polyvalent metal redox solution to precipitate the polyvalent metal as a polyvalent metal sulfide, and removing the polyvalent metal sulfide before treating the remaining redox solution under conditions sufficient to decompose the thiosulfate salts.

14. The method of claim 13 further including the step of recycling the redox solution, after thiosulfate decomposition, to the process for recovery of sulfur from the decomposition products.

15. A method of removing $H_2S$ and HCN from a process gas including the steps of:
    intimately contacting the process gas with a catalytic polyvalent metal redox solution to absorb the $H_2S$ and HCN and to form cyanide salts of cyanide complexes in the polyvalent metal redox solution, and simultaneously forming a reduced catalytic polyvalent metal redox solution;
    intimately contacting the catalytic reduced polyvalent metal redox solution with an oxidizing gas capable of oxidizing the reduced catalytic polyvalent metal redox solution sufficiently to regenerate the catalytic polyvalent metal redox solution to form an oxygenated polyvalent metal redox solution capable of again absorbing said $H_2S$ and HCN from said process gas;
    anaerobically heating a portion of the polyvalent metal redox solution containing the cyanide salts or cyanide complexes to a temperature in the range of about 400° F. to about 700° F. and a pressure of at least about 1000 psig, without the addition of hydrogen, for a time sufficient, to decompose the cyanide salts or complexes; and
    flowing the oxygenated polyvalent metal redox solution in intimate contact with said process gas for further absorption of $H_2S$ and HCN from said process gas.

16. The method of claim 15, wherein the polyvalent metal redox solution is heated for a time sufficient to decompose at least about 80% by weight of the thiosulfate salts present in the polyvalent metal redox solution.

17. The method of claim 15, wherein cyanide salts also are decomposed in the redox solution.

18. The method of claim 17, wherein the cyanide salts comprise a thiocyanate.

19. The method of claim 17, wherein the metal cyanide complexes are decomposed in the redox solution.

20. The method of claim 19, wherein the redox solution is a chelated iron solution and the metal cyanide complex is selected from the group consisting of $[Fe(CN)_6]^{-4}$, $[Fe(CN)_6]^{-3}$ and mixtures thereof.

21. The method of claim 17 further including the steps of withdrawing elemental sulfur together with a minor proportion of polyvalent metal redox solution; separating the elemental sulfur from the polyvalent metal redox solution; and wherein the polyvalent metal redox solution anaerobically treated to decompose the thiosulfate and cyanide salts is the polyvalent metal redox solution separated from the elemental sulfur.

22. The method of claim 21 further including the step of separating the dissolved polyvalent metal from the polyvalent metal redox solution before decomposing the thiosulfate and cyanide salts.

23. The method of claim 22, wherein the polyvalent metal is separated by adding $S^=$ to the polyvalent metal redox solution to precipitate the polyvalent metal as a polyvalent metal sulfide, and removing the polyvalent metal sulfide before treating the remaining redox solution under conditions sufficient to decompose the thiosulfate and cyanide salts.

24. The method of claim 23 further including the step of recycling the redox solution, after thiosulfate and cyanide decomposition, to the process for recovery of sulfur from the decomposition products.

25. The method of claim 15, wherein the redox solution is heated to a temperature of at least about 600° F. at a pressure of at least about 1500 psig for salt decomposition.

26. The method of claim 25, wherein the polyvalent metal redox solution is subjected to a temperature in the range of about 600° F. to about 700° F. at a pressure of about 1500-2500 psig for salt decomposition.

27. In an apparatus for effecting mass transfer of a liquid sequentially with two different gases in a separate mass transfer zone for each gas without permitting both gases to contact the same portion of the liquid simultaneously, including a first mass transfer zone for mass transfer between a liquid reagent and the first gas into the first mass transfer zone; a second mass transfer zone in liquid, but not vapor, communication with the first mass transfer zone; means for directing the liquid reagent from the first mass transfer zone into the second mass transfer zone; means for directing a second gas into the second mass transfer zone for intimate contact and mass transfer therebetween the improvement comprising:

an anaerobic hydrothermal converter disposed in the process to receive a portion of the liquid reagent, after said reagent has absorbed one or more materials from the process gas, said converted including means for heating the liquid reagent to a temperature sufficient to decompose thiosulfate salts to smaller molecules that are capable of forming elemental sulfur in the first or second mass transfer zone of the process.

28. In an apparatus as defined in claim 27 wherein the apparatus further includes means for separating elemental sulfur, recovered from said first or second mass transfer zones, from liquid reagent, said apparatus further including means for introducing the liquid reagent separated from the sulfur into the anaerobic hydrothermal converter for decomposition of thiosulfate salts present in the separated liquid reagent.

29. In an apparatus as defined in claim 28 further including means for recycling the liquid reagent, after hydrothermal conversion of thiosulfate salts, back to the first or second mass transfer zone for recovery of sulfur.

30. In an apparatus as defined in claim 29 further including means for separating a polyvalent metal from the liquid reagent prior to introducing the liquid reagent into the hydrothermal converter.

31. In an apparatus as defined in claim 30 further including means for directing a portion of decomposition products from the hydrothermal converter into the means for separating the polyvalent metal for precipitation of the polyvalent metal.

32. In an apparatus as defined in claim 27 wherein the apparatus further includes means for pressurizing the hydrothermal converter to a pressure of at least 1000 psig., without introducing oxygen into the hydrothermal converter.

33. A method of anaerobically reacting a sulfur or cyanide molecule selected from the group consisting of thiosulfate salts, cyanide salts, thiocyanate salts, metal cyanide complexes, and mixtures thereof, comprising introducing the sulfur or cyanide molecule and a reactant selected from the group consisting of hydrogen ions, oxygen ions, hydroxyl ions, $H_2O$ and combinations thereof, into a pressurized reaction vessel, without the addition of hydrogen or oxygen gas, and heating the sulfur or cyanide molecule and the reactant to a temperature greater than 400° F. at a pressure of at least 1000 psig, for a period of time sufficient to cause a reaction between the reactant and the sulfur or cyanide molecule.

* * * * *